Feb. 14, 1939.  R. SARDESON  2,147,385
AUTOMATIC ELECTRIC TOASTER
Filed March 11, 1937   2 Sheets-Sheet 1
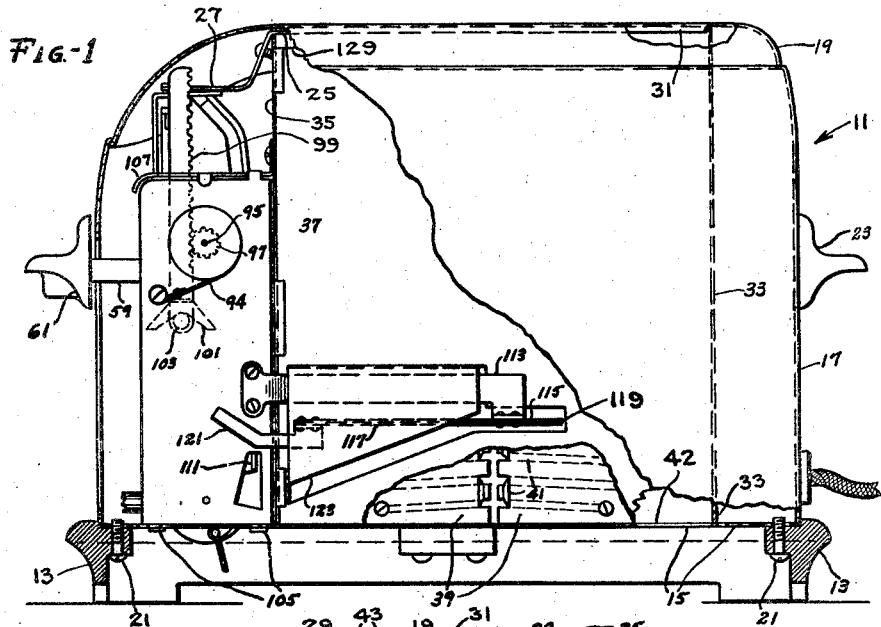
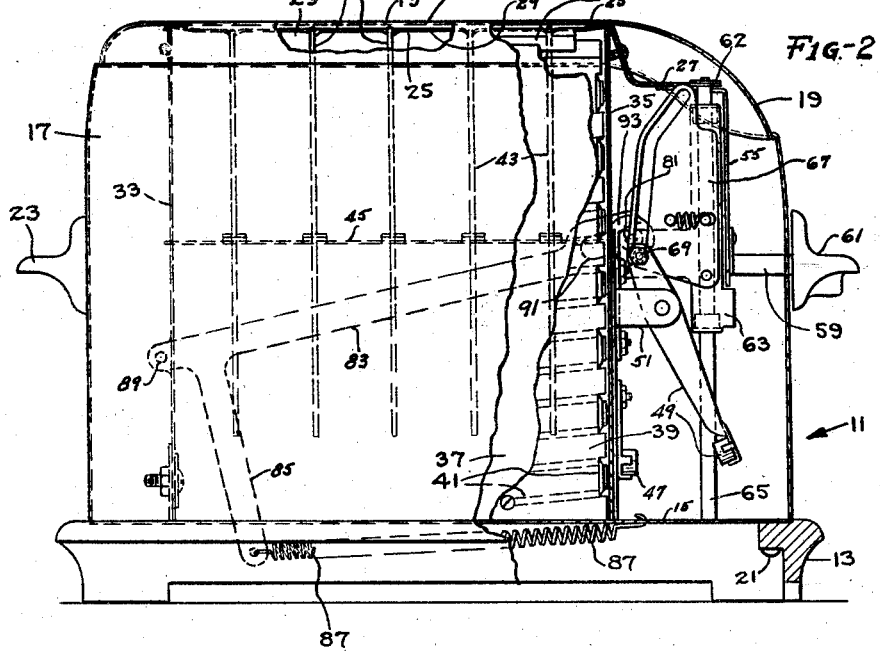
INVENTOR.
Robert Sardeson.
BY
ATTORNEY.

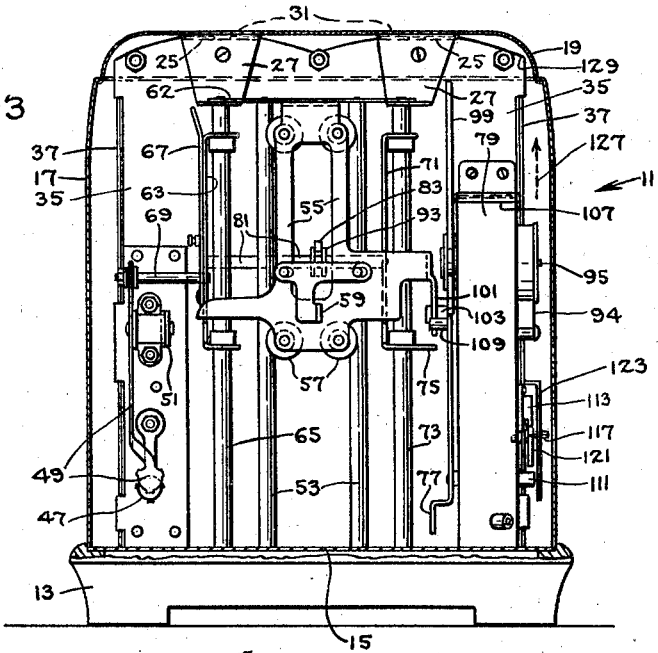

Patented Feb. 14, 1939

2,147,385

UNITED STATES PATENT OFFICE 2,147,385

AUTOMATIC ELECTRIC TOASTER

Robert Sardeson, Minneapolis, Minn., assignor to McGraw Electric Company, Chicago, Ill., a corporation of Delaware Application March 11, 1937, Serial No. 130,287

18 Claims. (Cl. 219—19)

My invention relates to electric toasters and particularly to automatic electric toasters.

An object of my invention is to provide a compensated thermostatic control means for an electric toaster to insure uniform toasting of successive slices of bread.

Another object of my invention is to provide a relatively simple, compact and efficient thermal-control element adapted to cooperate with a mechanical timer to vary the duration of an operating period of the toaster in accordance with temperature changes in the toaster.

Another object of my invention is to provide a thermally-responsive timing mechanism for controlling the operating period of a toaster, in which the thermal element shall be designed and constructed to operate with negligible time lag in response to varying temperature.

Another object of my invention is to provide a novel form of thermostat adapted to cooperate with a mechanical timer, which thermostat shall be adapted to be located in an advantageous position in a toaster.

Other objects of my invention will either be apparent from a description of one or more devices embodying my invention or will be pointed out in the course of such description.

In the drawings,

Figure 1 is a view, in side elevation with parts broken away, of a toaster embodying my improved thermostatic control means, Fig. 2 is a view mainly in side elevation and taken from a side opposite to that of Fig. 1, with parts broken away, Fig. 3 is a view in front elevation with the front of the casing removed, Fig. 4 is a fragmentary view in lateral section showing the location of the thermal element, and, Fig. 5 is a view similar to Fig. 4 showing a slightly modified construction.

An enclosed toaster 11 includes a bottom frame 13 which may be made of molded material and which has a thin metal plate 15 supported thereon, which plate constitutes the bottom closure of toaster 11. The toaster structure includes also a casing 17 comprising side, front and rear wall portions and an interfitting cover 19, all of which are already well known in the art. The casing may be secured to the base as by a plurality of short machine screws 21 shown particularly in Fig. 1 of the drawings. A lifting knob 23 is provided on the rear wall of the casing to be used to carry the toaster.

The assembly includes further two longitudinally extending top frame portions 25, having forwardly extending parts 27 to be hereinafter again referred to. Each of the frames 25 is provided with a longitudinally extending opening 29 therein which is adapted to register with an opening 31 in the cover portion of the casing to permit of slices of bread being inserted into and removed from the toaster.

I provide further a rear intermediate wall 33 extending laterally of the structure and a front intermediate wall 35 at the front of the structure, as well as a pair of baffle plates 37 at the respective sides of the assembly. I provide further one or more pairs of electric heating elements including thin sheets 39 of electric insulating material, such as mica, on which is wound a resistor wire or strip 41, each pair of heating elements being spaced apart a sufficient distance to permit of receiving therebetween a slice of bread to be toasted. As shown in several figures of the drawings, the resistor strip is positioned, for the greater part, on that side of the mica sheet or sheets facing the cooperating heating element so that, as is already well known in the art, a slice of bread is subjected to relatively high temperature radiant heat, the resistor wire or strip operating at either dull red heat or even at bright red heat. The front and rear intermediate walls and the baffle plates cooperate to define a toasting chamber within the casing, it being understood of course that the bottom plate 15 and the cover 19 also cooperate to define this toasting chamber. That part of the space within the casing between the front wall thereof and the front intermediate wall 35 may be called the mechanism chamber.

An opening 42 is provided in the bottom plate 15 between each pair of cooperating heating elements to permit of the ingress of a through draft of ventilating air adapted to flow through the toasting chamber and out through the openings 29 and 31 at the top of the toaster. The size and shape of the bottom opening may be varied to the desired or optimum amount of air to flow through the toasting chamber.

A plurality of depending guide wires 43 are provided suspended from the frames 25 and have their lower portions extending through suitable openings in bread slice supports 45 shown in broken lines in Fig. 2 of the drawings. These bread slice supports are adapted to be moved upwardly and downwardly in the toasting chamber, the upper position, that shown in Fig. 2 of the drawings, being the non-toasting position and a lower position near the bottom of the toasting chamber being the toasting position, since a slice of bread resting upon the support 45 will then be positioned substantially entirely within the toaster structure.

Means for controlling the energization of the plurality of heating elements includes a substantially fixed contact member 47 insulatedly mounted on front intermediate wall 35 and a contact 49 pivotally mounted on a bracket 51, which bracket is supported also by the front wall 35.

A pair of vertically extending standards 53 are positioned in parallel-spaced location in the mechanism chamber and a vertically movable carriage 55 is adapted to be moved upwardly and downwardly on the standards, rollers 57 being provided on the carriage to reduce the friction. The carriage 55 has a projection 59 extending outwardly through the slot in the front wall casing on which actuating knob 61 is mounted to permit of moving the carriage downwardly. The lower ends of the standards fit into and are held in plate 15 and the upper ends are received in a crossbar 62 and by the parts 27 of the top frames 25.

A slider 63 is adapted to move vertically on an outer left hand standard 65 and has a slotted plate 67 mounted thereon, a pin 69 secured to the upper end of a contact arm 49 being adapted to move in the slot in plate 67 to cause engagement of the contact arm with the fixed contact member 47, as the plate is moved to its lower position on the standard.

A slider 71 is mounted on a right hand outer standard 73 and has a projection 75 at its lower end adapted to engage with a latch 77, which latch is mounted on the frame of a mechanical timer 79.

The two bread slice supports are connected as by means of a laterally extending rod 81 (see Fig. 3 of the drawings) which rod also engages or is fixed to sliders 63 and 71 so that the bread slice supports, the slider and plate 57 will move as a unit.

Means for biasing the contact arm 49 to the position shown in Fig. 2 of the drawings where the switch is in its open position includes a bell crank lever, having a main arm 83 and a depending arm 85 to the lower end of which a biasing spring 87 is secured, the other end of spring 87 being secured to a hook in plate 15. The bell crank lever is pivotally mounted at 89 on the rear intermediate plate. The front end of arm 83 is provided with a slot 91 to receive a roller 93 and rod 81. Thus, when an operator presses downwardly on knob 61 he will cause closing of the switch and movement of the bread slice supports into toasting position.

The mechanical timer 79 constitutes no part of my invention and for details of construction thereof reference may be had to Patent No. 1,866,808 issued July 12, 1932, to M. Ireland, which patent is assigned to the same assignee as is the present application. It may be here pointed out that this timer includes a spring 94 which is adapted to be wound on a spring shaft 95, this shaft having pinion 97 fixed thereon which pinion is adapted to be engaged by a rack bar 99 movable downwardly by the cooperation of a depending extension 101 on carriage 55 engaging a lug or pin 103 on the lower end of rack bar 99. Thus, when carriage 55 is moved downwardly, not only will the switch be closed and the bread slice supports moved to their toasting position, but the timer will also be wound up, it being obvious that the slider 81 must be moved downwardly through a fixed distance in order to have the extension 75 thereon engaged below the latch 77. The timer may be held in its proper operative position in the mechanism chamber by engaging lugs 105 which interfit with plate 15 and by a top bracket 107 which may be secured against the front intermediate plate 35.

It is obvious that after the carriage 55 and the sliders 63 and 71 have been depressed, with attendant winding of the timer, the timer will immediately begin to unwind while the switch is held in closed position and the bread slice supports are held in toasting position. When the rack bar 99 has been returned to its uppermost position, carrying with it at the same time the carriage 55 and the projection 101, which projection is of the shape shown more particularly in Fig. 1 of the drawings, the outer edge portion of projection will engage a laterally projecting pin 109 on the upper end of pivotally mounted latch bar 77 to release the slider with immediate upward movement of the bread slice supports and simultaneous opening of the switch.

The mechanical timer shown in the drawings is one in which the speed is variable, the timer being provided with a speed adjusting member 111. A bracket arm 113 has one end thereof mounted on and secured to a side plate of the timer structure and has a compensated thermostat 115 secured thereto at the rear end of arm 113. Reference may here be made to my copending application Ser. No. 127,100 filed as of even date herewith and assigned to the same assignee as is the present application, for details as to its construction and operation. In general, the thermostat 115 includes a main bimetal bar 117 and an auxiliary compensating bar 119 which may be shorter than bar 117 and which constitutes the sole support for the main bar. The general shape of the thermostat 115 is that of a flat hairpin, both bars being adapted to flex or move in the same direction in response to a change in temperature.

While I have illustrated and described the compensated thermostat 115 as being supported solely from the timer as by bracket 113, I do not desire to be limited thereto, but have used this construction in the illustrations since it is the one now preferred by me. However, any other suitable equivalent support for the bimetal bar, as from the toaster structure will also be operative in the same manner and to the same degree as is the structure shown in these figures of the drawings.

The movable end of main bimetal bar 117 is provided with a cam surface 121 which cam surface is adapted to engage speed adjusting member 111 after a predetermined change in temperature of the toaster structure and the bimetal bar 117, which bimetal bar is adapted to move downwardly with increase in temperature. The action on the timer is to increase the speed and thereby to decrease the duration of an operating period of the toaster, the general object of this being to insure uniform toasting of successive slices of bread in a toaster of this kind irrespective of temperature changes in the toaster.

Referring now to Fig. 4 of the drawings, I have there illustrated one form of baffle plate 37, which baffle plate is provided with a bent out portion 123 punched out of the main body of the baffle plate and extending substantially parallel thereto. This overhanging portion 123 covers the bracket arm 113 and the greater part of main bimetal bar 117. Attention is called particularly to a recess 124 in the bottom of baffle plate 37 to permit of a closed circuit convection current of heating air caused by the heating means to flow upwardly as indicated by the broken line 125, between a heating element and the baffle plate 37 and the casing, as shown by the broken line 127 in Fig. 3 of the drawings. The baffle plate 37 stops short of the cover member 19 as indicated at 129 in Fig. 3 of the drawings. This closed circuit convection current of heating air caused by the heating means and circulating within the casing is therefore sharply defined by the baffle plate and it may be pointed out that the temperature of the heating air, some of which will flow around underneath portion 123 to also engage main bimetal bar 117 in order that this main bar may be heated to a relatively high temperature in order to make it less sensitive to outside disturbing influences, such as variations in the room temperature and also to make it more sensitive to temperature changes such as occur at the end of each toasting operation when the heating elements are deenergized.

It may be noted that auxiliary or compensating bimetal bar 119 is positioned substantially on the outside of baffle plate 37 and is therefore subjected to heating air having a somewhat lower temperature than that of a similar current of heating air between a heating element and baffle plate 37 and flowing in an upwardly direction. While therefore the main bimetal bar 117 is, in the construction shown in Fig. 4 of the drawings, subjected to high temperature radiant heat directly from an adjacent heating element, auxiliary bimetal bar 119 is in a zone of relatively lower temperature, receives a part of its heat by conduction from main bar 117, from the bracket arm 113 and from the closed circuit convection current of heating air which, when flowing downwardly between the baffle plate and the casing, is at a somewhat lower temperature.

Referring now to Fig. 5 of the drawings, I have there illustrated a modified form of construction of baffle plate 37 which is not provided with an aperture or notch at its bottom so that the sharply defined closed circuit convection current of air present in the construction shown in Fig. 4 of the drawings is not present. Main bimetal bar 117 is therefore subjected to a closed circuit convection current of air moving both upwardly and downwardly in the space between the mica sheets 39 and the baffle plate 37, it being obvious that the rising current of heating air is positioned closely adjacent to the mica sheets 39 and the descending current of air is positioned closely adjacent to baffle plate 37.

The auxiliary bimetal bar 119 is in this case also located in a zone of lower temperature than is the main bimetal bar 117, since the main bimetal bar is subject to high temperature radiant heat directly from the heating element and auxiliary bar 119 receives a portion of its heat by conduction from the main bimetal bar. The main bimetal bar is thus insulated from the thermal lag of the thermostat supporting means. A convection current of heating air will be present between the baffle plate 37 and casing 17, the ascending current of air being closely adjacent to casing 17. These convection currents of air will not be as sharply defined as would be the case if the construction shown in Fig. 4 of the drawings is utilized. However, I have found it possible to obtain adequately uniform toasting of successive slices of bread with either of the structures shown in Fig. 4 or Fig. 5 of the drawings.

The high expansion component in the main and in the auxiliary bimetal arm is on the same side of the thermostat structure, and therefore if the free end of the main bar 117 is moved downwardly with increase of temperature, the auxiliary bimetal bar 119 will have its free end moved downwardly also with increase of temperature. It is obvious, from what has already been stated above, that the operation of the auxiliary bimetal bar will occur with some time lag relatively to the operation of the main bimetal bar and that the operation or flexing of the auxiliary bimetal bar will reduce the movement of the free end of the main bimetal bar or, stated in other words, cause reduction in the pressure of the free end of the main bar on member 111 or even a return movement of the main bimetal bar before the termination of a toasting operation.

The nullifying power of the auxiliary bimetal bar increases as its temperature rises relatively to the temperature of the main bar and since, during the time the heating element is energized, the main bimetal bar is at a higher temperature than is the auxiliary bimetal bar and since there is a lesser difference in their temperature after the heating element is deenergized, it follows that the ability of the auxiliary bimetal bar to cause a return movement of the main bar or to partly nullify the action of the main bar increases after the heating element is deenergized. This results in a much more accurate control of the duration of an operating period of a toaster to obtain substantially uniform toasting of successive slices of bread irrespective of the length of the intervals between successive operations.

Another important feature of my invention is that as the compensating means is not subject to nor directly influenced by air flowing through the toasting chamber, it is possible to arrange for the optimum amount of air necessary for substantially perfect toasting, to flow through the toasting chamber.

This effect of the auxiliary bimetal bar is a very desirable one since it enables me to proportion the effect of the auxiliary bimetal bar to operate with negligible time lag in response to varying temperatures, with the result that the cooperating elements of the timing mechanism can be so arranged as to insure substantially uniform toasting of successive slices of bread in a toaster irrespective of the time of rest between successive operations.

I am aware of certain prior art relating to toasters of this general type, among which may be mentioned Patent No. 1,665,735 to Forbes showing a bimetal bar located between a baffle plate and a side wall of a casing, which side wall is provided with louvres to permit a through cooling draft of air to flow past the bimetal bar. Reissue Patent 18,923 to Harris discloses a bimetal bar subjected to radiant heat directly from a heating means and also to a convection current of air caused by the heating means. I am also aware of a toaster embodying a thermal control element located in the toasting chamber in the bottom portion thereof and subjected to radiant heat from one or more heating means and to a through draft of cooling air at its entering temperature.

In contradistinction to this my invention discloses a bimetal element shielded from external drafts, from drafts reflecting changes in external temperature, from currents of air not of substantially toaster temperature, and simultaneously subjected to the effect of plurality of primary and secondary heat sources. The main bimetal bar is subjected to the thermal effect of the radiant heat directly from the heating element, to reflected radiant heat from the portion 123 of the baffle plate 37 and to a convection current of heating air, the temperatures of all of these heat sources being relatively high, that of the heating element being the highest. It is obvious that the higher temperature of the thermal element the greater will be its sensitivity and the greater will be its independence of changes in room temperature and of external drafts. As is well known, the radiation of heat from a body is substantially in accordance with the fourth power of its temperature and I therefore prefer to operate the thermal element at as high a temperature as the toaster and heating elements will permit.

The auxiliary bar is subjected to conducted heat transmitted thereto from the supporting bracket arm and from the main bimetal bar and also to a convection current of heating air and its temperature may therefore be slightly lower than that of the main bar and changes in its temperature will lag behind those of the main bar. It is possible by proper design and construction of the thermostat and its support and by proper location thereof, to cause the main bimetal bar to operate with a negligible time lag, that is as though its mass was substantially zero, thus insuring that the response of the main bimetal bar will be such as to follow the changes of temperature of those surfaces of the toaster structure which control the duration of a toasting operation. Tests on a toaster of this kind have shown that it is possible to obtain uniform toasting of successive slices of bread irrespective of the length of intervals between successive toasting operations.

While I have illustrated and described my invention using a variable speed clock, the invention is not limited thereto but I may use a constant speed clock and a compensated bimetal thermostat cooperating therewith to control the duration of an operating period of a toaster and the claims appended hereto are to be construed to cover both kinds of mechanical timers except when specifically limited to a variable speed timer.

Various modifications may be made in the device embodying my invention without departing from the spirit and scope thereof and I desire therefore that only such limitations shall be placed thereon as are embodied by the prior art or are set forth in the appended claims.

I claim as my invention:

1. In a toaster, the combination with a heating means, a toasting chamber defined in part by the heating means, an outer casing, a baffle plate between the outer casing and the heating means and means to initiate a toasting operation, of means to terminate a toasting operation, said terminating means including a mechanical timer located outside of the toasting chamber and a thermally-actuable means supported solely by the timer and adapted to cooperate with the timer to vary the duration of operation of a toaster, said thermally-actuable means comprising a main bimetal element and an auxiliary bimetal element supported solely from the timer and supporting the main bimetal element, the main bimetal element being positioned on one side of said baffle plate and the auxiliary bimetal element being positioned on the other side of the baffle plate.

2. A device as set forth in claim 1 in which the main bimetal element is positioned at that side of the baffle plate facing the heating means and the auxiliary bimetal element is positioned at that side of the baffle plate facing the outer casing.

3. A toaster comprising a casing, electric heating means therein, a baffle plate between the casing and the heating means, a control switch for the electric heating means, biased to open position, a mechanical timer, a means adapted to be moved in one direction and connected to effect closing of the switch and winding of the timer, a latch to hold said switch in closed position and a bimetal thermostat supported solely by the timer and adapted to cooperate with the timer to vary the duration of an operating period of the toaster, said bimetal thermostat including a main portion located at one side of the baffle plate, between the baffle plate and the heating means, and an auxiliary compensating portion located at the other side of the baffle plate, between the baffle plate and the casing, said auxiliary portion being the sole support of the main portion.

4. A device as set forth in claim 3 in which the two portions of the bimetal thermostat are subjected to a closed circuit convection current of heating air caused by the heating means.

5. In a toaster, the combination with a heating means and means to initiate a toasting operation, of means to terminate a toasting operation, said terminating means including a mechanical timer, a main bimetal element out of thermal control by a slice of bread being toasted and effective to cooperate with the mechanical timer to vary the duration of operation of a toaster and an auxiliary bimetal element constituting the sole support for the main bimetal element and effective to modify the action of the main bimetal element to insure substantially uniform toasting of successive slices of bread in the toaster irrespective of temperature changes in the toaster, said bimetal elements extending in side-by-side positions and in substantially coextensive heat zones of different temperatures laterally of said heating means.

6. In a toaster, the combination with a heating means and means to initiate a toasting operation, of means to terminate a toasting operation, said terminating means including a variable speed mechanical timer, a main bimetal element located at that side of the heating means away from a slice of bread being toasted by said heating means to control the speed of the mechanical timer to vary the duration of operation of a toaster and a delayed-action auxiliary bimetal element unitary and partially coextensive with said main bimetal element to modify the control effect of the main bimetal element to insure substantially uniform toasting of successive slices of bread in a toaster irrespective of temperature changes in the toaster and means cooperating with said heating means to cause at least the main bimetal element to be subjected to a sharply defined closed circuit convection current of heating air caused by the heating means.

7. In a toaster, the combination with a heating means and means to initiate a toasting operation, of means to terminate a toasting operation, said terminating means including a mechanical timer, a main bimetal element positioned outside of a slice of bread being toasted for cooperating with the mechanical timer to vary the duration of a toasting period of a toaster and an auxiliary bimetal element for modifying the control effect of the main bimetal element to insure substantially uniform toasting of successive slices of bread in a toaster irrespective of temperature changes in the toaster, said auxiliary bimetal element being the sole support for the main bimetal element and a support for the auxiliary bimetal element positioning it in one heat zone of the toaster and the main bimetal element in another heat zone of the toaster.

8. A device as set forth in claim 7 in which the temperature of the heat zone in which the main bimetal element is located is higher than the temperature of the heat zone in which the auxiliary bimetal element is located.

9. In a toaster, the combination with a heating means and means to initiate a toasting operation, of means to terminate a toasting operation, said terminating means including a mechanical timer, a bracket arm having one end secured to the timer and having its other end extending away from the timer, a bimetal element having an auxiliary portion supported from the other end of the bracket arm and a main portion supported by the auxiliary portion and effective to cooperate with the timer to vary the duration of a toasting period of a toaster in accordance with changes of temperature in the toaster, said main and auxiliary portions being located in spaced partially coextensive side-by-side position with only the main portion subjected to radiant heat directly from the heating means.

10. A toaster comprising a casing, a toasting chamber therein, heating means in the toasting chamber, means for initiating a toasting operation, and means for terminating a toasting operation, said terminating means including a mechanical timer and a compensated bimetal thermostat for cooperating with the timer to vary the operating period of a toaster in accordance with the toaster temperature, said bimetal thermostat comprising a main portion and an auxiliary portion unitary and partially coextensive with each other and a thermostat-supporting means on which the auxiliary portion is mounted and which supports and positions the main portion to receive radiant heat directly from the heating means.

11. A toaster comprising a casing, a toasting chamber therein, heating means in the toasting chamber, means for initiating a toasting operation and means for terminating a toasting operation, said terminating means including a mechanical timer and a compensated bimetal thermostat cooperating with the timer to vary the duration of an operating period of a toaster in accordance with changes in toaster temperature, said bimetal thermostat comprising a main portion and an auxiliary portion, supporting means for positioning said thermostat to subject the main portion to radiant heat direct from the heating means and to cause the auxiliary portion to be heated mainly by conduction from the main portion, and means cooperating with the heating means to cause at least the main portion to be subjected to a sharply defined closed circuit convection current of heating air caused by said heating means.

12. An automatic toaster comprising an electric heater, a control switch for the heater biased to open position, a mechanical timer, a single means movable to cause winding of the timer and closing of the switch, a latch for holding the switch closed and means to cause release of the latch after a time interval the length of which varies with toaster temperature, said release means including said mechanical timer, and a bimetal element and means supporting the bimetal element solely from the timer, said bimetal element including a main bimetal bar having a portion movable in one direction to cooperate with the timer to vary said time interval in accordance with toaster temperature and a compensating bimetal bar secured to said supporting means and cooperating with the main bar and effective to insulate the main bimetal bar from the thermal lag of the supporting means, said support for the compensating bar being such as to cause the main bar to be subjected to relatively high temperature radiant heat direct from the electric heater and including also means cooperating with said heater to cause the main and the compensating bimetal bars to be subjected to a closed circuit convection current of heating air caused by the energized heater.

13. An automatic toaster comprising an electric heater, a control switch for the heater, a bread slice support movable to toasting and to non-toasting position relatively to the heater, a single means biasing the switch to open position and the bread slice support to non-toasting position, a mechanical timer, a single means movable through a fixed distance to cause winding of the timer, closing of the switch and movement of the bread slice support to toasting position, latch means effective to hold the switch in closed position and means to cause release of the latch after a time interval the length of which varies with toaster temperature, said release means including said mechanical timer, a main bimetal bar having a portion movable in one direction to cooperate with the timer to vary said time interval and a compensating bimetal bar cooperating with the main bimetal bar and having a portion movable in said one direction to reduce the effect of the thermal lag of the main bimetal bar to cause successive durations of toasting operations of a toaster to be such as to effect substantially uniform toasting of slices of bread irrespective of variations of toaster temperature, a substantially fixed support for said main bimetal bar for positioning it to cause it to be subjected to relatively high temperature radiant heat directly from the electric heater when the same is energized, the compensating bimetal bar being the sole support of the main bimetal bar and extending parallel therewith and receiving an appreciable amount of heat by conduction from the main bar, said support for the main and the compensating bimetal bars positioning them to be subjected to a closed circuit convection current of heating air caused by the energized heater and means including a baffle plate adjacent to the heater to sharply define and direct said air current.

14. An automatic toaster comprising an electric heater, a control switch for the heater, a bread slice support movable to toasting and to non-toasting position relatively to the heater, a single means biasing the switch to open position and the bread slice support to non-toasting position, a mechanical timer, a single means movable through a fixed distance to cause winding of the timer, closing of the switch and movement of the bread slice support to toasting position, latch means effective to hold the switch in closed position and means to cause release of the latch after a time interval the length of which varies with toaster temperature, said latch release means including said mechanical timer, a main bimetal bar having a portion movable in one direction to cooperate with the timer to vary said time interval and a compensating bimetal bar cooperating with the main bimetal bar and having a portion movable in said one direction to reduce the effect of the thermal lag of the main bimetal bar to cause successive durations of toasting operations of a toaster to be such as to effect substantially uniform toasting of slices of bread irrespective of variations of toaster temperature, the compensating bimetal bar being the sole support for the main bimetal bar and being located in spaced side-by-side relation relatively to the main bar and a support for the compensating bar to locate it in a heat zone of different temperature than is the main bimetal bar to cause its operation to take place with a certain time lag behind that of the main bimetal bar.

15. An automatic toaster comprising an electric heater, a control switch for the heater, a bread slice support movable to toasting and to non-toasting position relatively to the heater, a single means biasing the switch to open position and the bread slice support to non-toasting position, a mechanical timer, a single means movable through a fixed distance to cause winding of the timer, closing of the switch and movement of the bread slice support to toasting position, latch means effective to hold the switch in closed position and means to cause release of the latch after a time interval the length of which varies with toaster temperature, said latch release means including said mechanical timer, a main bimetal bar having a portion movable in one direction to cooperate with the timer to vary said time interval and a compensating bimetal bar cooperating with the main bimetal bar and having a portion movable in said one direction to reduce the effect of the thermal lag of the main bimetal bar to cause successive durations of toasting operations of a toaster to be such as to effect substantially uniform toasting of slices of bread irrespective of variations of toaster temperature, a substantially fixed support for said main bimetal bar for positioning it to cause it to be subjected to relatively high temperature radiant heat directly from the electric heater when the same is energized, the main bimetal bar being integral with and supported solely by the compensating bar and being located in spaced partially coextensive side-by-side relation to the compensating bar, said support for the compensating bar positioning it in a lower temperature heat zone than that in which the main bar is positioned and means to cause both bars to be subjected to a closed circuit convection current of heating air caused by the heater when energized.

16. A toaster as set forth in claim 9 in which the toaster includes a baffle plate at one side of the heating means, the auxiliary bimetal element being positioned at that side of the baffle plate away from the heating means and the main bimetal element being positioned at that side of the baffle plate adjacent to the heating means, and in which both main and auxiliary bimetal elements are adapted to be subjected to a sharply defined closed circuit convection current of heating air caused by the heating means and flowing around the baffle plate, the temperature of said convection current being but slightly below that of the heating means.

17. A device as set forth in claim 1 in which the baffle plate cooperates with the heating means to cause at least the main bimetal element to be subjected to a closed circuit convection current of heating air created by the heating means.

18. A device as set forth in claim 1 in which the main bimetal element is positioned between the baffle plate and the heating means and the auxiliary bimetal element is positioned between the baffle plate and the outer casing and in which the baffle plate cooperates with the energized heating means and the casing to cause the main bimetal element to be subjected to a convection current of heating air having a relatively high temperature and to cause the auxiliary bimetal element to be subjected to a convection current of heating air having a temperature lower than that of the air to which the main bimetal element is subjected.

ROBERT SARDESON.